(12) United States Patent
Stanfill et al.

(10) Patent No.: US 8,369,572 B2
(45) Date of Patent: Feb. 5, 2013

(54) SYSTEM AND METHOD FOR PASSIVE AUTOMATIC TARGET RECOGNITION (ATR)

(75) Inventors: Steven Robert Stanfill, Kissimmee, FL (US); Daniel B. Rutherford, Rockwell, TX (US); Hassan N. Beydoun, Dearborn, MI (US); Robert R. Muise, Oviedo, FL (US); Abhijit Mahalanobis, Orlando, FL (US); Ramamurthy Bhagavatula, Pittsburgh, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 871 days.

(21) Appl. No.: 12/457,368

(22) Filed: Jun. 9, 2009

(65) Prior Publication Data

US 2010/0310121 A1      Dec. 9, 2010

(51) Int. Cl.
*G06K 9/00* (2006.01)
*H04N 7/18* (2006.01)
*H04N 5/225* (2006.01)

(52) U.S. Cl. ................ 382/103; 348/144; 348/169

(58) Field of Classification Search .......... 382/103, 382/107, 236; 348/169, 170, 171, 172, 208.1, 348/208.2, 208.14, 94, 154, 155, 208.16, 348/352; 342/90, 95, 96

See application file for complete search history.

(56) References Cited

U.S. PATENT DOCUMENTS

| | | | | |
|---|---|---|---|---|
| 5,576,964 A | * | 11/1996 | Choate | 701/514 |
| 6,042,050 A | * | 3/2000 | Sims et al. | 244/3.17 |
| 6,529,614 B1 | * | 3/2003 | Chao et al. | 382/103 |
| 6,633,847 B1 | * | 10/2003 | Fang | 704/270 |
| 7,421,090 B2 | * | 9/2008 | Muise et al. | 382/103 |

* cited by examiner

*Primary Examiner* — Abolfazl Tabatabai
(74) *Attorney, Agent, or Firm* — Withrow & Terranova, PLLC

(57) ABSTRACT

A passive automatic target recognition (ATR) system includes a range map processor configured to generate range-to-pixel map data based on digital elevation map data and parameters of a passive image sensor. The passive image sensor is configured to passively acquire image data. The passive ATR system also includes a detection processor configured to identify a region of interest (ROI) in the passively acquired sensor image data based on the range-to-pixel map data, and an ATR processor configured to generate an ATR decision for the ROI.

20 Claims, 11 Drawing Sheets

SYSTEM AND METHOD FOR PASSIVE AUTOMATIC TARGET RECOGNITION (ATR)

STATEMENT REGARDING FEDERALLY SPONSORED RESEARCH OR DEVELOPMENT

At least some aspects of this invention were made with Government support under contract number E337XT5UPT. The Government may have certain rights in this invention.

BACKGROUND

Digital terrain maps of the earth are available from various sources. For example, the Shuttle Radar Topography Mission (SRTM) is a joint project between the National Geospatial-Intelligence Agency (NGA) and the National Aeronautics and Space Administration (NASA). The objective of the SRTM is to produce digital topographic data for much of the earth's land surface using interferometric synthetic aperture radar. The digital topographic data can be formatted as height above mean sea level for each given latitude and longitude. While the digital topographic data of the earth produced by the SRTM is non-classified and publicly-releasable, digital terrain maps of the earth are available or can be generated from other non-classified and classified sources.

Automatic target recognition (ATR) techniques are known that actively identify targets such as moving and/or stationary aircraft, ships, motor vehicles, etc. These techniques use a transmitter to emit radio waves, which are reflected by a target, and a receiver to detect the reflected radio waves. By analyzing the detected radio waves, the identity of the target can be automatically determined.

SUMMARY

An exemplary passive ATR system includes a range map processor configured to generate range-to-pixel map data based on digital elevation map data and parameters of a passive image sensor. The passive image sensor is configured to passively acquire image data. The passive ATR system also includes a detection processor configured to identify a region of interest (ROI) in the passively acquired sensor image data based on the range-to-pixel map data and an ATR processor configured to generate an ATR decision for the ROI.

An exemplary method for passive ATR includes passively acquiring image data with a passive image sensor, generating range-to-pixel map data based on digital elevation map data and parameters of the passive image sensor, identifying a ROI in the passively acquired sensor image data based on the range-to-pixel map data, and generating an ATR decision for the ROI.

BRIEF DESCRIPTION OF THE DRAWINGS

Other objects and advantages will become apparent to those skilled in the art upon reading the following detailed description of preferred embodiments, in conjunction with the accompanying drawings, in which like reference numerals have been used to designate like elements, and in which.

DETAILED DESCRIPTION

Figure 1:
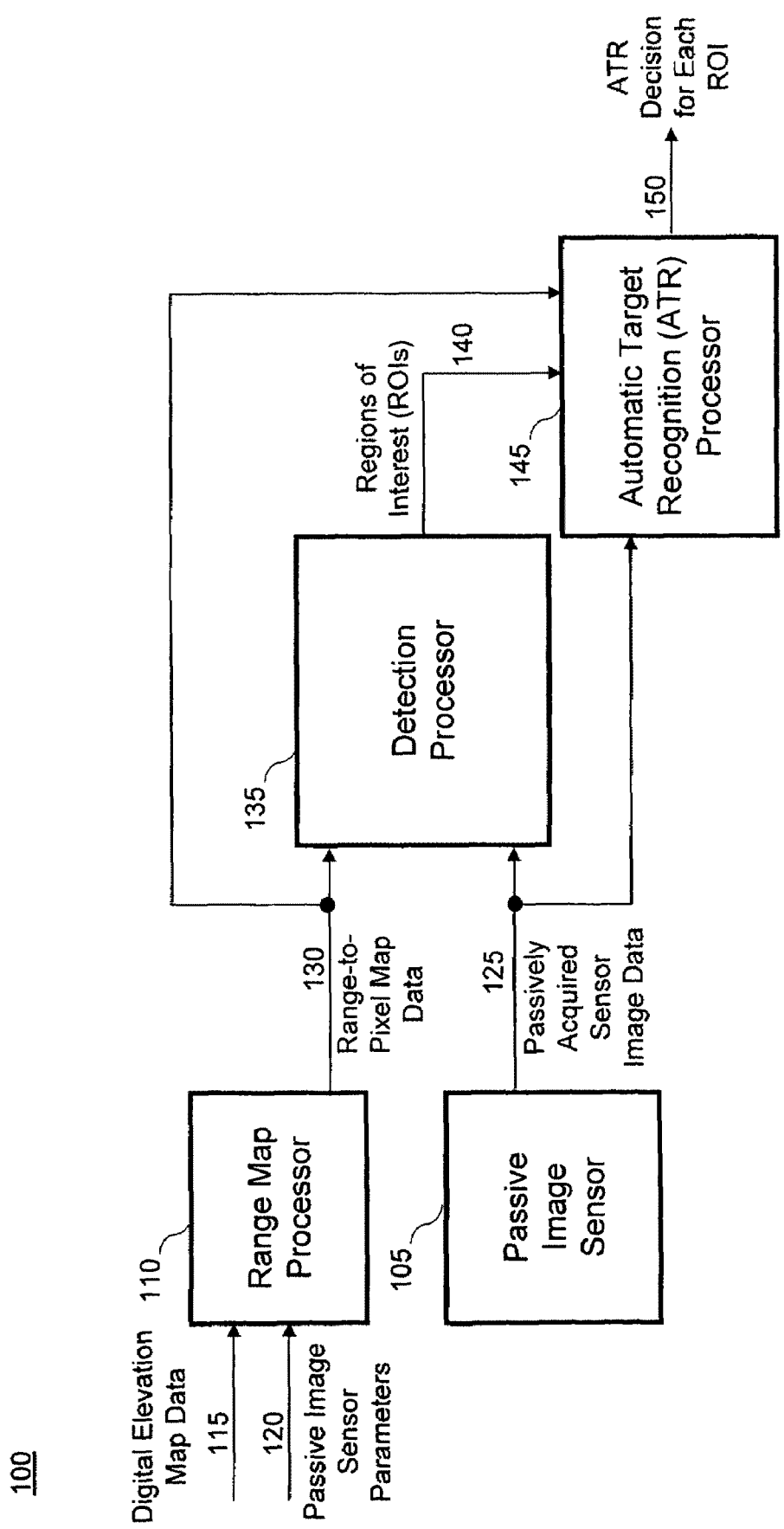
FIG. 1 illustrates an exemplary embodiment of a passive ATR system.

FIG. 1 illustrates an exemplary passive ATR system 100. Passive ATR system 100 includes a passive image sensor 105, a range map processor 110, a detection processor 135 and an ATR processor 145. In accordance with an aspect of the present disclosure, the passive ATR system 100 can be employed in conjunction with a computer-based system, where the elements of the system 100 can be implemented in hardware, software, firmware, or combinations thereof.

In an exemplary embodiment, the passive image sensor 105 can be implemented as an electronic device, which measures infrared (IR) energy radiating from objects without emitting any type of energy itself. Thus, unlike active image sensors, the passive image sensor 105 can operate covertly (e.g., without giving away its location). As shown in FIG. 1, the passive image sensor 105 can produce passively acquired sensor image data 125 that, in one embodiment, comprises IR intensity data.

Performance of the ATR system 100 can depend on high-fidelity range measurements to target detections. Thus, in an exemplary embodiment, the range map processor 110 can be configured to generate range-to-pixel map data 130 based on digital elevation map data 115 and parameters 120 of the passive image sensor 105. The digital elevation map data 115 can include topographical data of the earth, such as that acquired by the SRTM. The digital elevation map data 115 can also be obtained from other classified and non-classified sources. In one embodiment, the digital elevation map data 115 can be formatted as height above mean sea level.

The parameters 120 of the passive image sensor 105 can include location, field-of-view (FOV), range, and sample size, among others. Implementation of the passive image sensor 105 can vary depending on the application for which the ATR system 100 is being used. For example, the passive image sensor 105 can be mounted to the mast of a motor vehicle operating at a field location so that the passive image sensor 105 can be pointed in various directions and passively acquire image data of surrounding terrain. A global positioning system (GPS) device can also be mounted on the vehicle mast so that location/position data of the passive image sensor 105 can be determined in terms of GPS coordinates.

The passive image sensor 105 can have an associated FOV and range. These parameters can describe the angular expanse and distance of terrain, respectively, visible to the passive image sensor 105 for a given sensor location/position. The passive image sensor 105 can also have an associated sample size. For example, in one embodiment, the passive image sensor 105 can be implemented as a collection of pixel elements arranged in a plane in which each pixel element is itself a sensor. In this way, the sample size parameter can describe the number of pixels elements making up the passive image sensor 105.

Various automatic and/or manual techniques can be implemented for determining the parameters 120 of the passive image sensor 105, as will be understood by those skilled in the art, and the range map processor 110 can process the parameters 120 of the passive image sensor 105 in conjunction with the digital elevation map data 115 in real-time or after the passive image sensor parameters 120 have been recorded.

The passive image sensor 105 and the range map processor 110 may or may not be co-located. For example, the passive image sensor 105 can operate from a field location, while the range map processor 110 can operate at a facility remote from the field location of the passive image sensor 105.

Figure 2A:
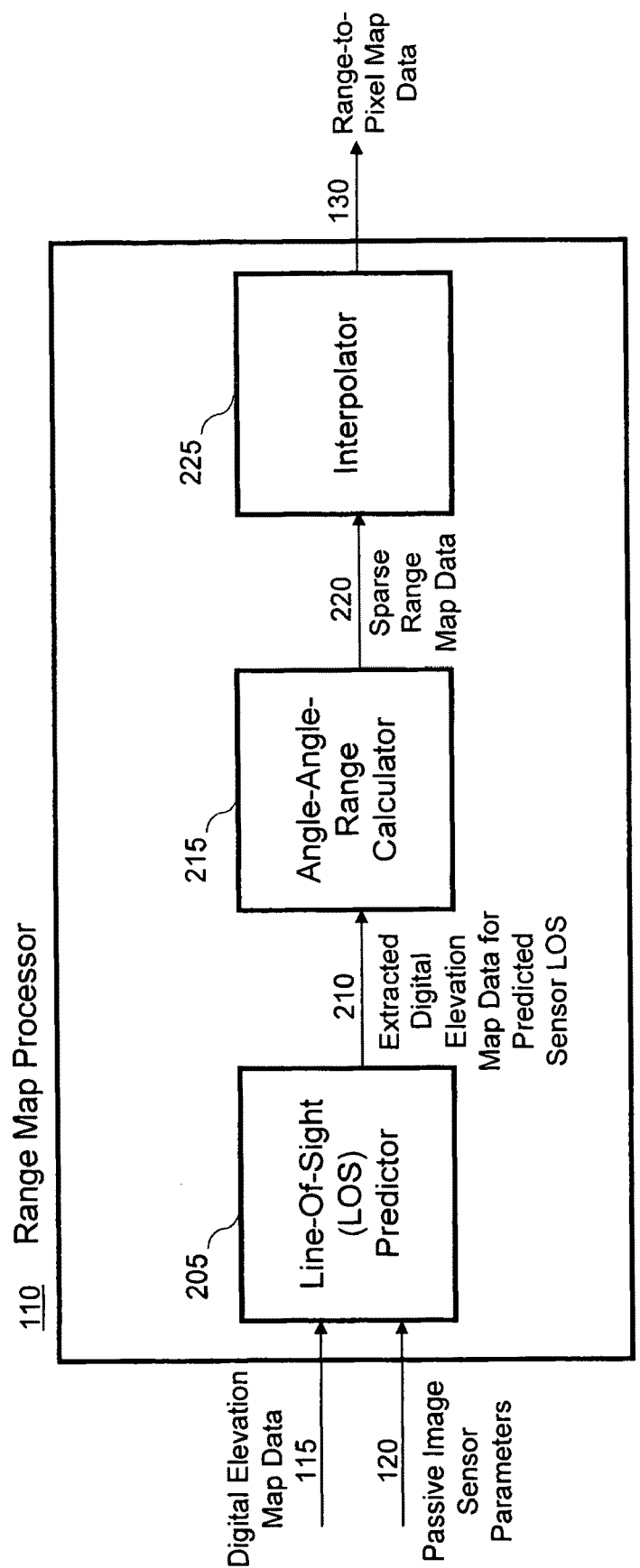
FIG. 2A illustrates an exemplary embodiment of a range map processor.

FIG. 2A illustrates an exemplary embodiment of the range map processor 110. As shown in FIG. 2A, the range map processor 110 can include a line-of-sight (LOS) predictor 205, an angle-angle-range calculator 215 and an interpolator 225. In an exemplary implementation, the LOS predictor 205 can be configured to predict a LOS of the passive image sensor 105, in accordance with the passive image sensor parameters 120. For example, the LOS predictor 205 can predict the LOS of the passive image sensor 105 using location/position, FOV and range parameters. In this way, the LOS predictor 205 can extract a portion 210 of the digital elevation map data 115 that corresponds to the predicted LOS of the passive image sensor 105.

Figure 2B:
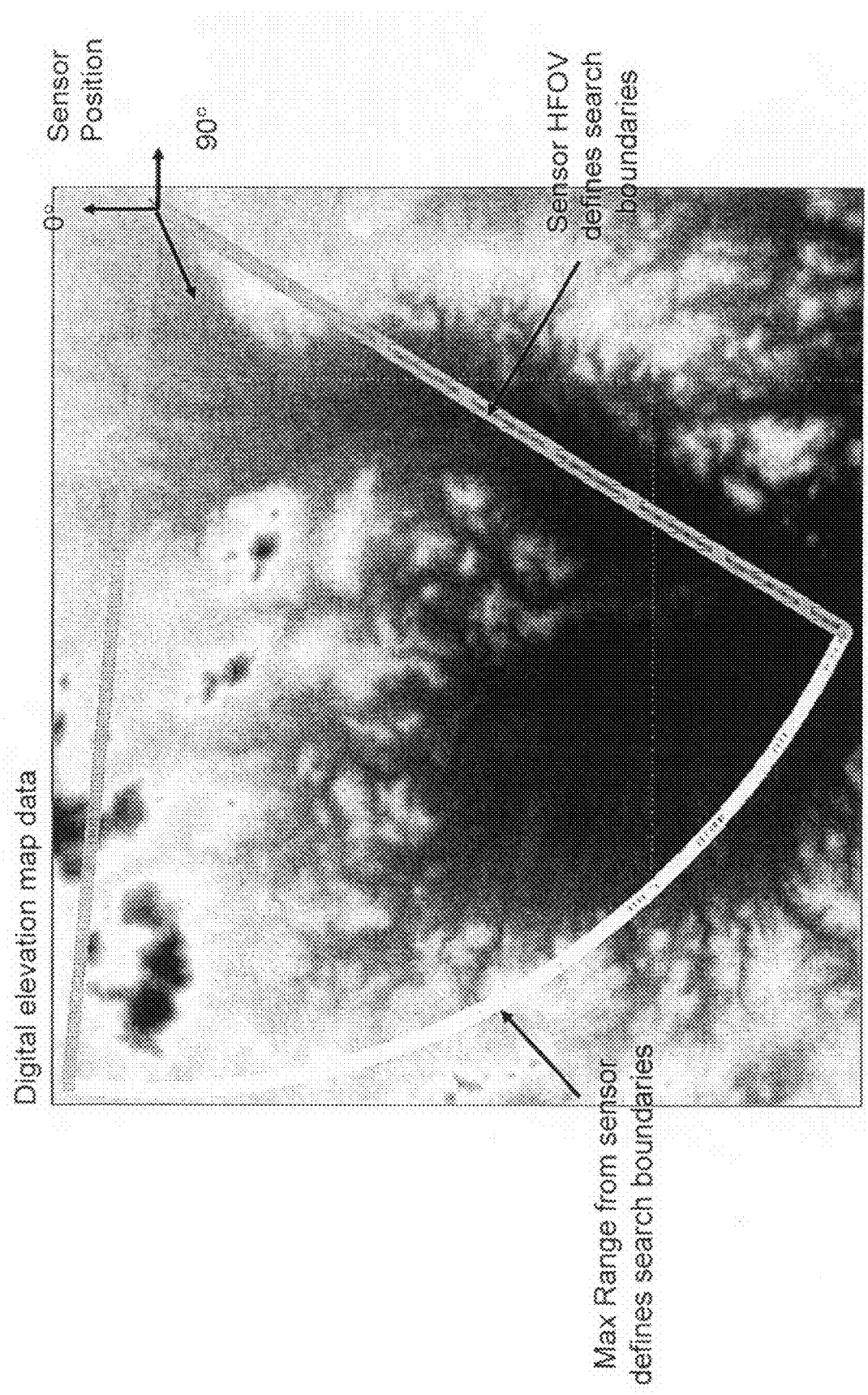
FIG. 2B illustrates an exemplary extraction of digital elevation map data for a predicted sensor line-of-sight (LOS)

FIG. 2B illustrates an exemplary extraction of digital elevation map data 115 for a predicted sensor LOS. As shown in FIG. 2B, passive image sensor parameters 120 such as position, horizontal FOV and maximum range can be used to extract the portion of the digital elevation map data 115 within the predicted LOS of the passive image sensor 105.

As shown in FIG. 2A, the angle-angle-range calculator 215 can be configured to calculate sparse range map data 220 from the extracted digital elevation map data 210 using ray tracing techniques known in the art.

In an exemplary embodiment, the angle-angle-range calculator 215 can calculate ranges to the extracted digital elevation map data 210 for angles from the passive image sensor 105 for which pixels are visible in the extracted digital elevation map data 210.

Figure 2C:
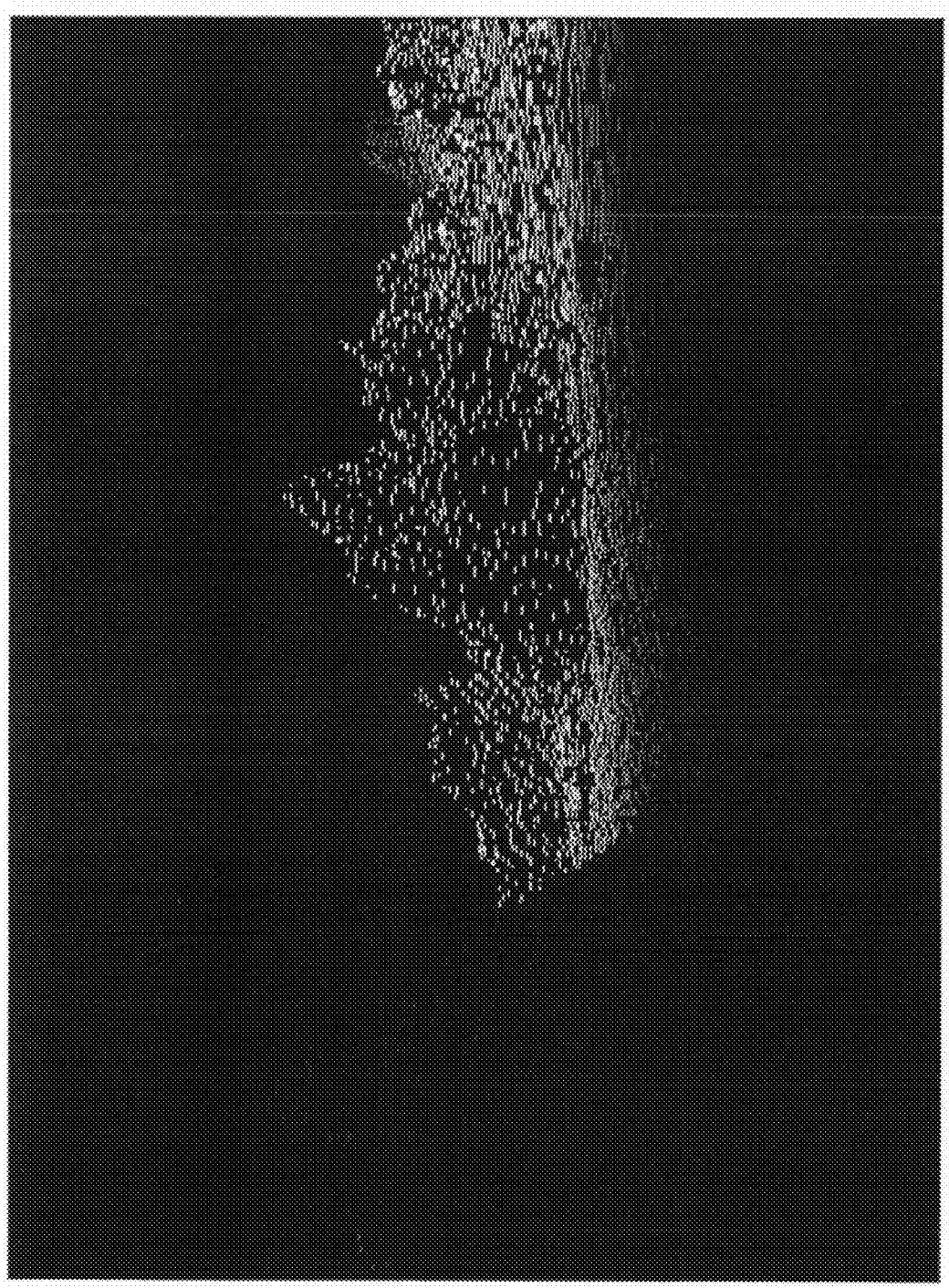
FIG. 2C illustrates an exemplary sparse range map.
Figure 2D:
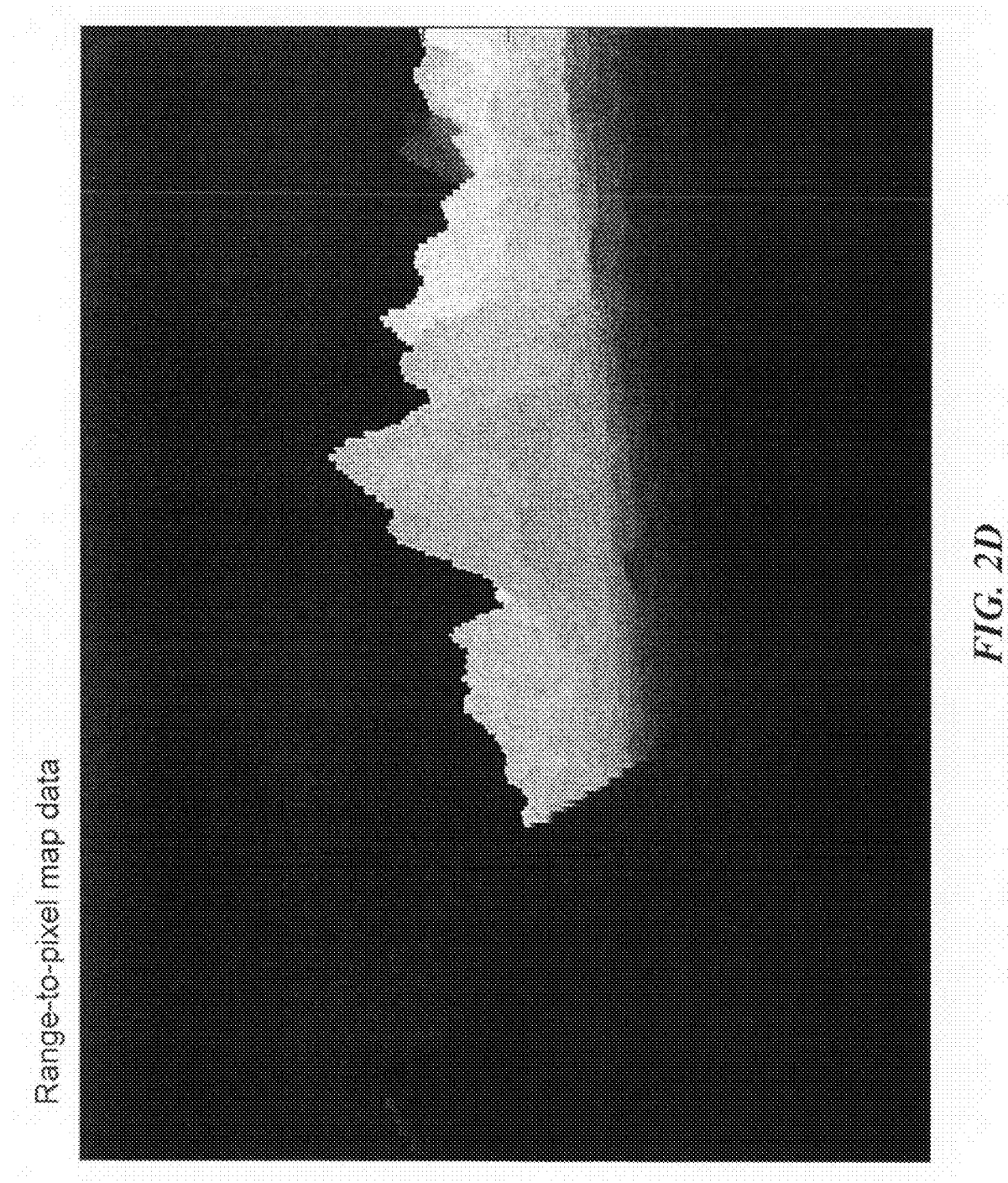
FIG. 2D illustrates an exemplary range-to-pixel map.

FIG. 2C illustrates an exemplary sparse range map. Because pixels in the extracted digital elevation map data 210 will not be visible for every angle from the passive image sensor 105, the interpolator 225 can generate the range-to-pixel map data 130 by interpolating the sparse range map data 220. Thus, the interpolator 225 can approximate a range to the extracted digital elevation map data 210 for angles from the passive image sensor 105 for which pixels are not visible in the extracted digital elevation map data 210. In this way, the range-to-pixel map data 130 can include ranges for every angle from the passive image sensor 105. FIG. 2D illustrates an exemplary range-to-pixel map.

Figure 3:
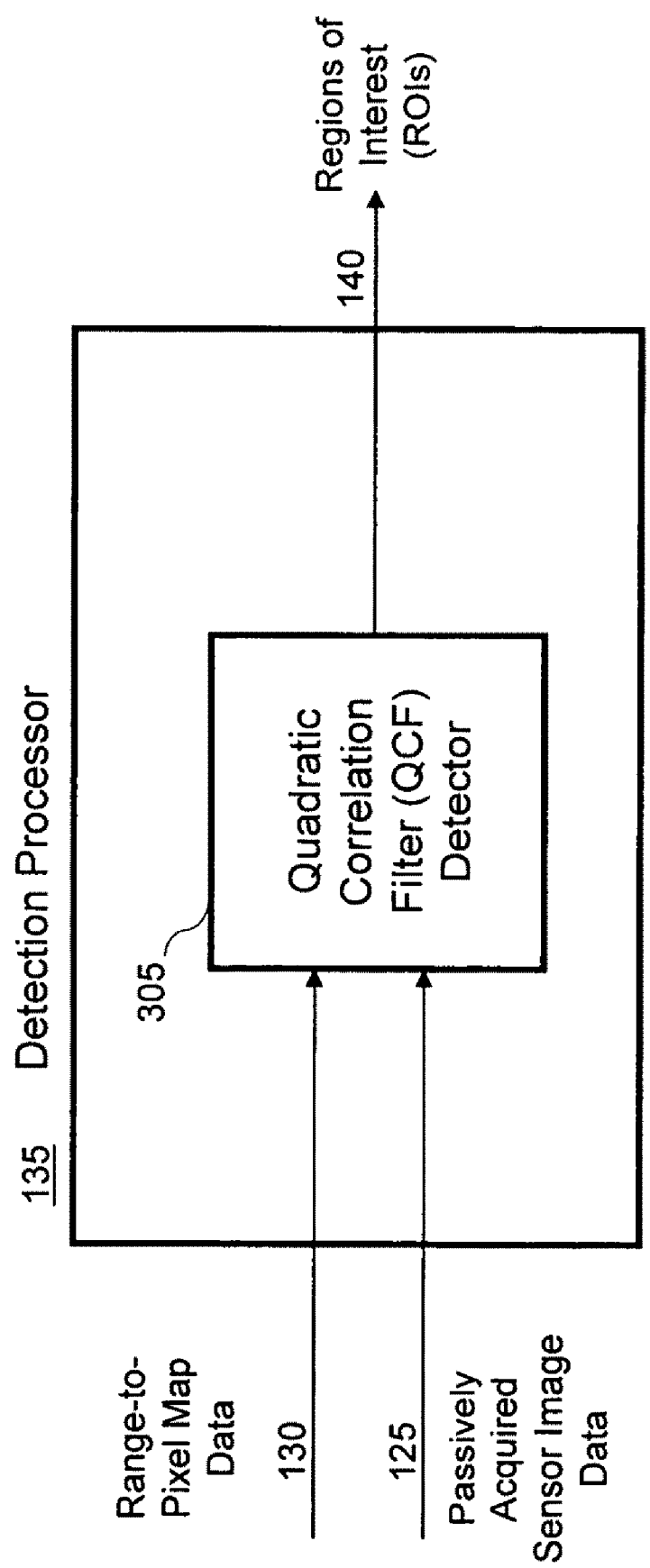
FIG. 3 illustrates an exemplary embodiment of a detection processor.

FIG. 3 illustrates an exemplary embodiment of the detection processor 135. The detection processor 135 can be configured to identify regions of interest (ROIs) 140 in the passively acquired sensor image data 125 based on the range-to-pixel map data 130. As shown in the embodiment of FIG. 3, the detection processor 135 can include a quadratic correlation filter (QCF) detector 305. Techniques for implementing a QCF are known in the art. For example, U.S. Pat. No. 7,421,090 (Muise et al), the disclosure of which is hereby incorporated by reference in its entirety, discloses a target system, having a detection device which includes a trained detection component (which uses a priori knowledge in the detection process) and an untrained detection component. The trained detection component can apply correlation filters to received image data, the correlation filters having been created (or "trained") using a priori knowledge, such as known images. The trained detection component in an exemplary embodiment receives image data and outputs a composite detection map output. The trained detection component can include a set of linear correlation filters, where each linear correlation filter is ranked within a transformation matrix according to its level of correlation to the presence of clutter or to the presence of a target. A difference in target and clutter filter response energies for pixels with image data can be used to indicate the presence of a target or of clutter. A composite image can be produced, and a thresholding function can be used to indicate the presence of a candidate target in a ROI. Such a process can be used herein to determine the ROIs, wherein the range-to-pixel map data can be used as a priori knowledge to currently scale each correlation filter for a given range.

In an exemplary embodiment, the QCF detector 305 can thus be implemented as a bank of linear detection filters that can discriminate between objects and clutter in an image of a scene. As mentioned, the range-to-pixel map data can be considered at least a portion of the a priori information used to train the correlation filters. Correlation peaks in a composite image output from the QCF detector 305 can be distinguished using thresholds and can be used to denote positions of objects in the scene. These positions can be considered to identify the "regions of interest" (ROIs) 140 in the passively acquired sensor image data 125. Each ROI 140 can be defined as a pixel location in the passively acquired sensor image data 125 and an area surrounding the pixel location (where the area can be designated by the user, and/or set in advance).

Figure 4:
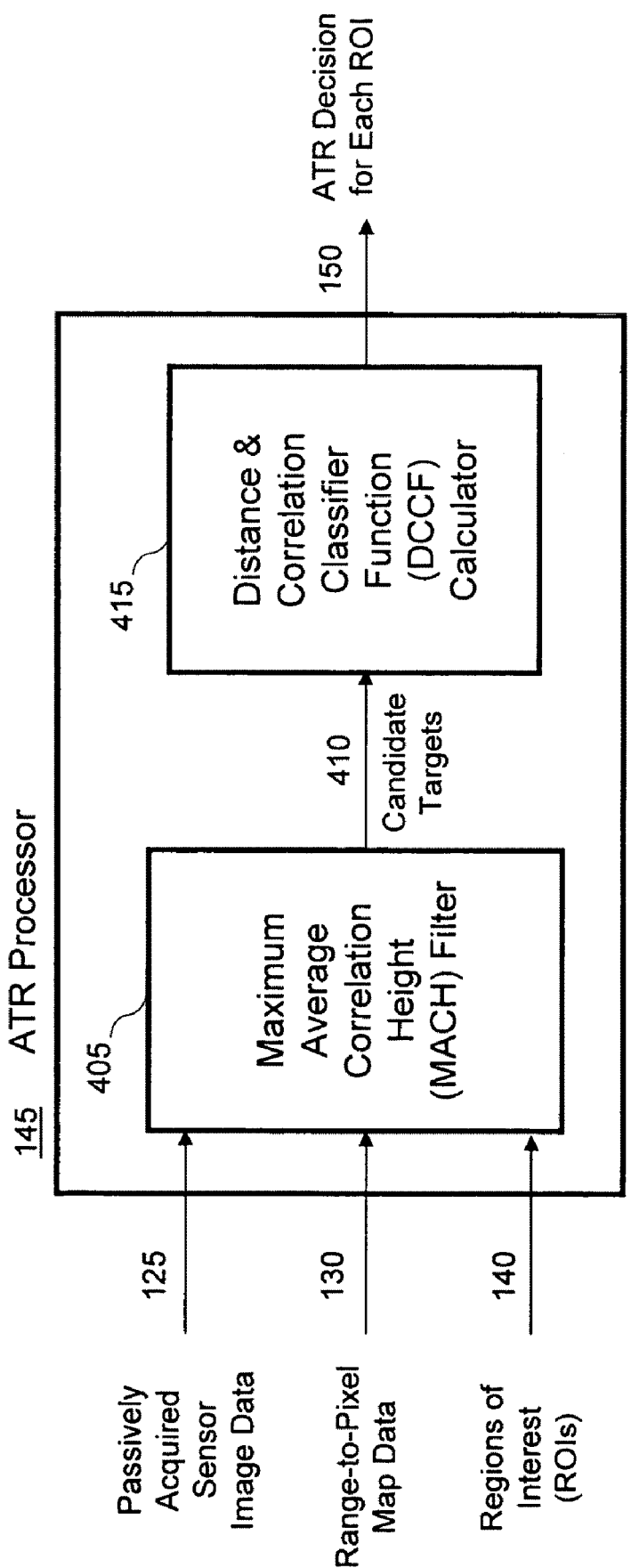
FIG. 4 illustrates an exemplary embodiment of an ATR processor.

FIG. 4 illustrates an exemplary embodiment of the ATR processor 145 which can be used to detect the presence of a target within an ROI. The ATR processor 145 can be configured to generate an ATR decision 150 for each ROI 140. As shown in FIG. 4, the ATR processor 145 can include a maximum average correlation height (MACH) filter 405 and a distance and correlation classifier function (DCCF) calculator 415. Known techniques can be employed for implementing the MACH filter and the DCCF. For example, with regard to the MACH filter, the aforementioned '090 patent discloses that differences in target and clutter filter response energies can be used to indicate the presence of a candidate target within a given pixel. Thresholding can be applied to each pixel to detect the candidate target within the ROI.

The MACH filter 405 can be configured to filter the passively acquired sensor image data 125 in accordance with the range-to-pixel map data 130 to identify candidate targets 410 corresponding to each ROI 410. To identify candidate targets corresponding to a ROI 140, the MACH filter 405 can independently test one class of targets (e.g., ships, tanks, aircraft, etc.) at a time using a database of template images of different classes of targets. The MACH filter 405 can be configured to use the range-to-pixel map data 130 to estimate a size of a target in the ROI 140 based on the range from the passive image sensor 105 to the actual ROI. In other words, the way a target appears in the passively acquired sensor image data 125 can vary depending on the distance of the target from the passive image sensor 105. For example, a target that is closer to the passive image sensor 105 (e.g., 100 meters away) will appear larger in the image than a target that is farther away (e.g., 400 meters away) from the passive image sensor 105. Thus, the performance of the MACH filter 405 can be enhanced by searching the template database only for images of template targets corresponding to the estimated target size. The MACH filter 405 can output candidate targets 410 for further processing by the DCCF calculator 415.

The DCCF calculator 415 can be configured to generate the ATR decision 150 for each ROI 140 based on the candidate targets 410. In one embodiment, the DCCF calculator 410 can be configured to remove ambiguity from the candidate targets 410 output by the MACH filter 405. For example, the DCCF calculator 410 can use target detection capabilities as discussed herein and as disclosed in the '090 patent, but can be implemented to dynamically compare different views (e.g., front view, rear view, broadside view) of a candidate target 410 to templates of those views and generate the ATR decision 150. For each ROI 140, the DCCF calculator 415 can generate an ATR decision 150 that identifies a particular target and an associated confidence level (e.g., a measure of how likely the ATR decision 150 correctly identifies the target in the passively acquired sensor image data 125), or the ATR decision 150 can indicate that no targets are identified for the ROI 140.

FIGS. 5-8 illustrate an exemplary method 500 for passive ATR in accordance with exemplary embodiments. Not all of the steps of FIGS. 5-8 must occur in the order shown, as will be apparent to those skilled in the art based on the teachings herein. Other operational and structural embodiments will be apparent to those skilled in the art based on the following discussion. In accordance with an aspect of the present disclosure, the method 500 illustrated in FIGS. 5-8 can be employed in conjunction with a computer-based system, where the method can be executed by hardware, software, firmware, or combinations thereof.

Figure 5:
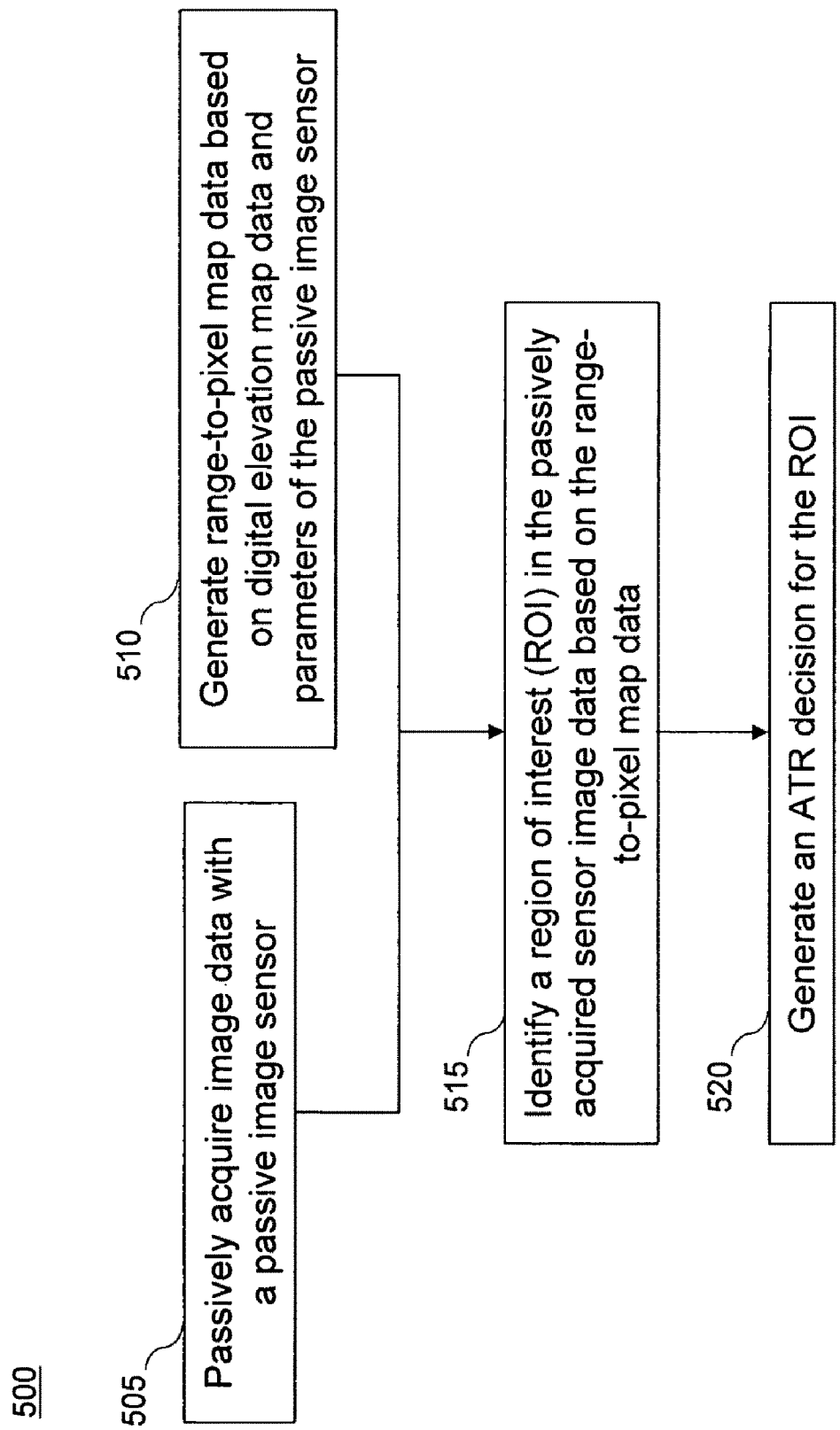
FIGS. 5-8 illustrate flow diagrams for a method of passive ATR in accordance with exemplary embodiments.

As shown in FIG. 5, in step 505, image data can be passively acquired using a passive image sensor. For example, the passive image sensor can passively acquire IR intensity data. In step 510, range-to-pixel map data can be generated based on digital elevation map data and parameters of the passive image sensor. In one implementation, passively acquiring the image data can be accomplished using the passive image sensor 105, and generating the range-to-pixel map data can be accomplished using the range map processor 110, as described with FIG. 1.

Figure 6:
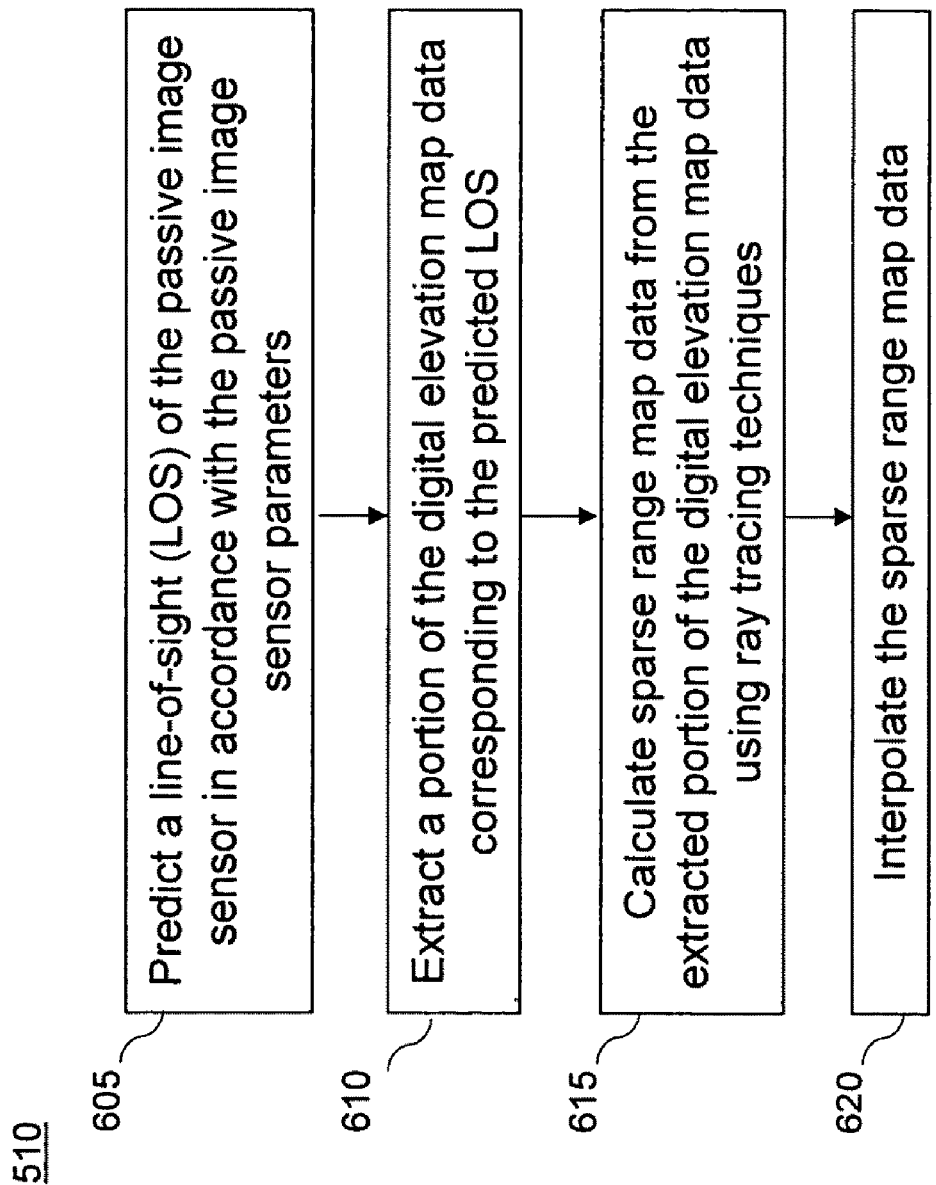
Figure 7:
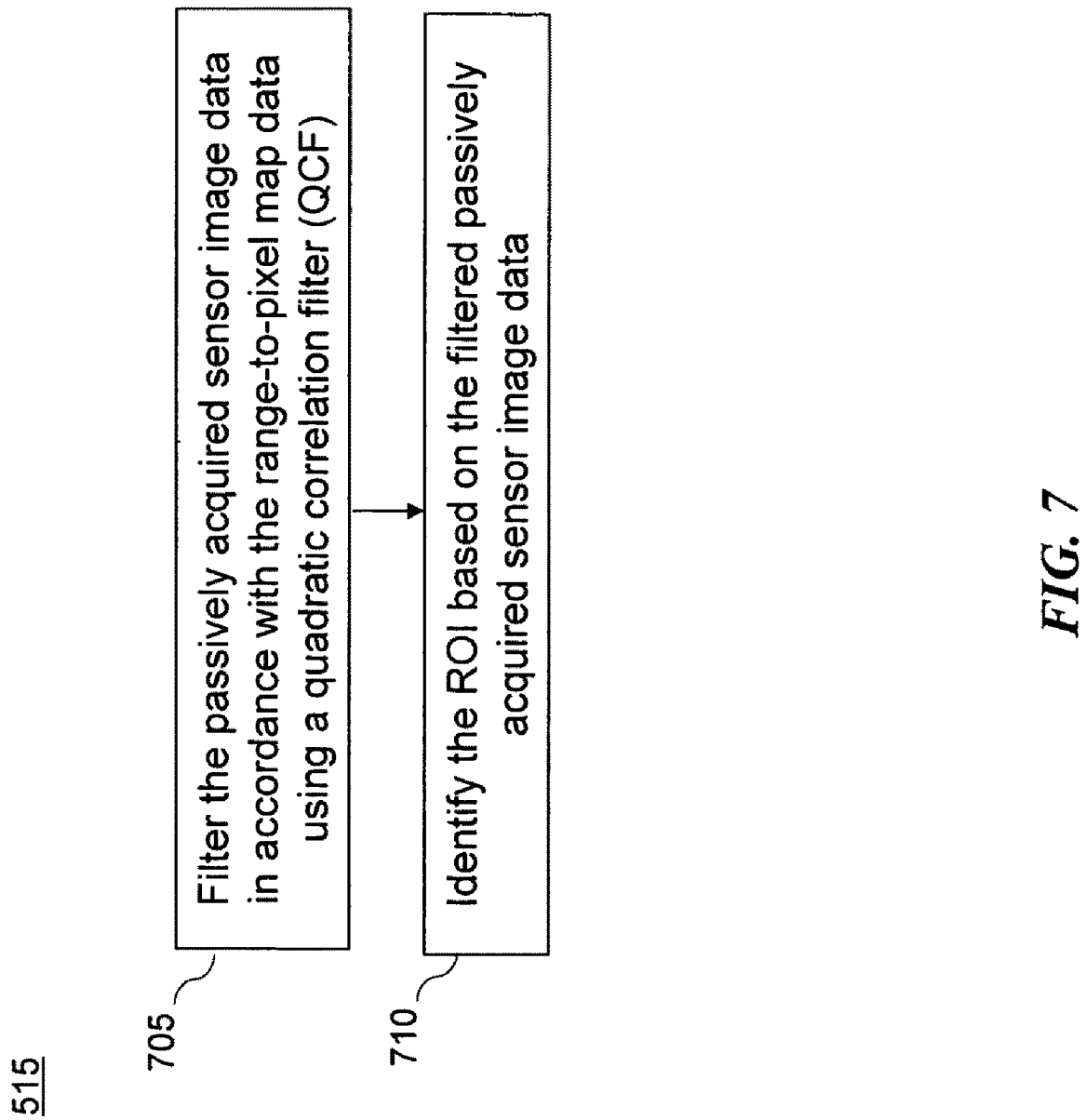
Figure 8:
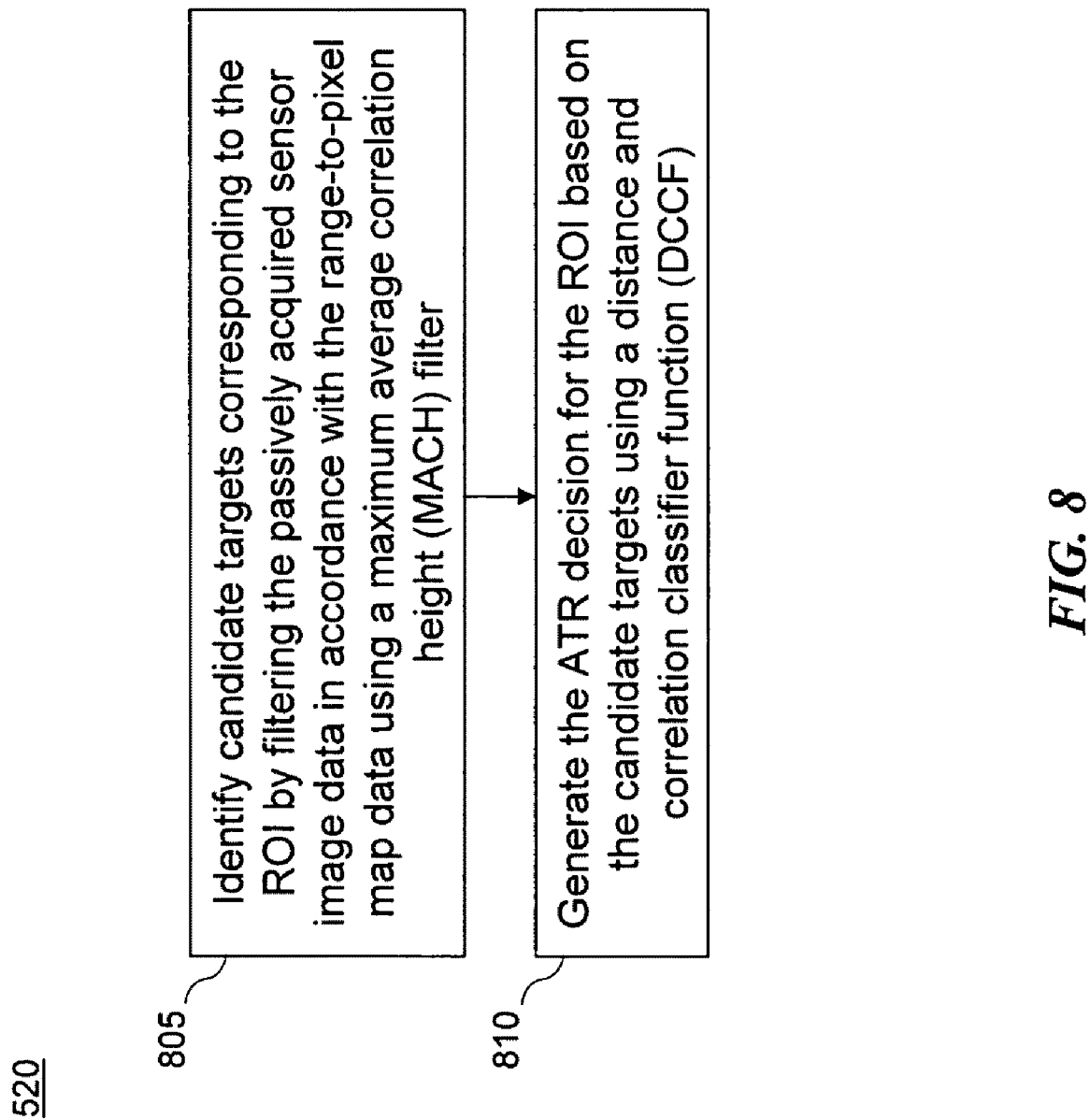

In an exemplary embodiment, step 510 can include the additional steps shown in FIG. 6. In step 605, a LOS of the passive image sensor can be predicted in accordance with the passive image sensor parameters. For example, the LOS of the passive image sensor can be predicted in accordance with location, FOV, range, and sample size parameters associated with the passive image sensor. In step 610, a portion of the digital elevation map data corresponding to the predicted LOS can be extracted.

In step 615, sparse range map data can be calculated from the extracted portion of the digital elevation map data using ray tracing techniques. The sparse range map data can include ranges to the extracted portion of the digital elevation map data for angles from the passive image sensor for which pixels in the extracted portion of the digital elevation map data are visible (e.g., as shown in the example of FIG. 2C). In step 620, the sparse range map data can be interpolated. For example, the sparse range map data can be interpolated to approximate a range to the extracted portion of the digital elevation map data for angles from the passive image sensor for which pixels in the extracted portion of the digital elevation map data are not visible (e.g., as shown in the example of FIG. 2D). In one implementation, predicting the sensor LOS and extracting the portion of the digital elevation map data can be accomplished using the LOS predictor 205, generating the sparse range map data can be accomplished using the angle-angle-range calculator 215, and interpolating the sparse range map data can be accomplished using the interpolator 225, as described in conjunction with FIG. 2.

Referring to FIG. 5, in step 515, a ROI can be identified based on the range-to-pixel map data and passively acquired sensor image data. In one implementation, identifying the ROI can be accomplished using the detection processor 135, described in conjunction with FIG. 1. In an exemplary embodiment, step 515 can include the additional steps shown in FIG. 7. In step 705, the passively acquired sensor image data can be filtered in accordance with the range-to-pixel map data using a QCF. In step 710, the ROI can be identified based on the filtered passively acquired sensor image data. In one implementation, filtering and identifying the ROI can be accomplished using the QCF filter detector 305, described in conjunction with FIG. 3.

Referring again to FIG. 5, in step 520, an ATR decision can be generated for the ROI. In one implementation, generating the ATR decision can be accomplished using the ATR processor 145, described in conjunction with FIG. 1. In an exemplary embodiment, step 520 can include the additional steps shown in FIG. 8. In step 805, candidate targets corresponding to the ROI can be identified by filtering the passively acquired sensor image data in accordance with the range-to-pixel map data using a MACH filter. In step 810, the ATR decision for the ROI can be generated based on the candidate targets using a DCCF. For example, generating the ATR decision can include identifying a target and an associated confidence level, or indicating that no targets are identified for the ROI. In one implementation, identifying the candidate targets can be accomplished using the MACH filter 405, and generating the ATR decision can be accomplished using the DCCF calculator 415, described in conjunction with FIG. 4.

The present invention has been described with reference to exemplary embodiments. However, it will be readily apparent to those skilled in the art that the invention can be embodied in specific forms other than those of the exemplary embodiments described herein. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A passive automatic target recognition (ATR) system, comprising:
   a range map processor configured to generate range-to-pixel map data based on digital elevation map data and parameters of a passive image sensor, wherein the passive image sensor is configured to passively acquire image data;
   a detection processor configured to identify a region of interest (ROI) in the passively acquired sensor image data based on the range-to-pixel map data;
   an ATR processor configured to generate an ATR decision for the ROI; and
   a line-of-sight (LOS) predictor configured to predict a LOS of the passive image sensor in accordance with the passive image sensor parameters and extract a portion of the digital elevation map data corresponding to the predicted LOS.

2. The passive ATR system of claim 1, wherein the digital elevation map data is formatted as terrain height above mean sea level.

3. The passive ATR system of claim 1, wherein the passive image sensor parameters include location, field-of-view (FOV), range, and sample size.

4. The passive ATR system of claim 1, wherein the passive image sensor is configured to passively acquire infrared intensity data.

5. The passive ATR system of claim 1, wherein the detection processor comprises:
   a quadratic correlation filter (QCF) detector configured to filter the passively acquired sensor image data in accordance with the range-to-pixel map data to identify the ROI.

6. The passive ATR system of claim 5, wherein the ROI includes a pixel location in the passively acquired sensor image data and an area surrounding the pixel location.

7. The passive ATR system of claim 1, wherein the ATR processor comprises:
a maximum average correlation height (MACH) filter configured to filter the passively acquired sensor image data in accordance with the range-to-pixel map data to identify candidate targets corresponding to the ROI.

8. The passive ATR system of claim 7, wherein the ATR processor comprises:
a distance and correlation classifier function (DCCF) calculator configured to generate the ATR decision for the ROI based on the candidate targets.

9. The passive ATR system of claim 8, wherein the ATR decision identifies a target and an associated confidence level or indicates that no targets are identified for the ROI.

10. A passive automatic target recognition (ATR) system, comprising:
a range map processor configured to generate range-to-pixel map data based on digital elevation map data and parameters of a passive image sensor, wherein the passive image sensor is configured to passively acquire image data;
a detection processor configured to identify a region of interest (ROI) in the passively acquired sensor image data based on the range-to-pixel map data; and
an ATR processor configured to generate an ATR decision for the ROI,
wherein the range map processor comprises:
a line-of-sight (LOS) predictor configured to predict a LOS of the passive image sensor in accordance with the passive image sensor parameters and extract a portion of the digital elevation map data corresponding to the predicted LOS; and
an angle-angle-range calculator configured to calculate sparse range map data using ray tracing techniques, and
wherein the sparse range map data includes ranges to the extracted portion of the digital elevation map data for angles from the passive image sensor for which pixels in the extracted portion of the digital elevation map data are visible.

11. The passive ATR system of claim 10, wherein the range map processor comprises:
an interpolator configured to interpolate the sparse range map to generate the range-to-pixel map data,
wherein the interpolator is configured to approximate a range to the extracted portion of the digital elevation map data for angles from the passive image sensor for which pixels in the extracted portion of the digital elevation map data are not visible.

12. A method for passive automatic target recognition (ATR), comprising:
passively acquiring image data with a passive image sensor;
generating range-to-pixel map data based on digital elevation map data and parameters of the passive image sensor;
identifying a region of interest (ROI) in the passively acquired sensor image data based on the range-to-pixel map data; and
generating an ATR decision for the ROI,
wherein the generating range-to-pixel map data comprises:
predicting a line-of-sight (LOS) of the passive image sensor in accordance with the passive image sensor parameters; and
extracting a portion of the digital elevation map data corresponding to the predicted LOS.

13. The passive ATR method of claim 12, wherein the passively acquiring image data comprises: passively acquiring infrared intensity data.

14. The passive ATR method of claim 12, wherein the predicting a LOS of the passive image sensor comprises:
predicting a LOS of the passive image sensor in accordance with location, field-of-view (FOV), range, and sample size associated with the passive image sensor.

15. The passive ATR method of claim 12, wherein the identifying the ROI comprises:
filtering the passively acquired sensor image data in accordance with the range-to-pixel map data using a quadratic correlation filter (QCF); and
identifying the ROI based on the filtered passively acquired sensor image data.

16. The passive ATR method of claim 12, wherein the generating an ATR decision for the ROI comprises:
identifying candidate targets corresponding to the ROI by filtering the passively acquired sensor image data in accordance with the range-to-pixel map data using a maximum average correlation height (MACH) filter.

17. The passive ATR method of claim 16, wherein the generating an ATR decision for the ROI comprises:
generating the ATR decision for the ROI based on the candidate targets using a distance and correlation classifier function (DCCF).

18. The passive ATR method of claim 16, wherein the generating the ATR decision for the ROI comprises:
identifying a target and an associated confidence level or indicating that no targets are identified for the ROI.

19. A method for passive automatic target recognition (ATR), comprising:
passively acquiring image data with a passive image sensor;
generating range-to-pixel map data based on digital elevation map data and parameters of the passive image sensor; and
identifying a region of interest (ROI) in the passively acquired sensor image data based on the range-to-pixel map data; and generating an ATR decision for the ROI,
wherein the generating range-to-pixel map data comprises:
predicting a line-of-sight (LOS) of the passive image sensor in accordance with the passive image sensor parameters;
extracting a portion of the digital elevation map data corresponding to the predicted LOS; and
calculating sparse range map data from the extracted portion of the digital elevation map data using ray tracing techniques, and
wherein the sparse range map data includes ranges to the extracted portion of the digital elevation map data for angles from the passive image sensor for which pixels in the extracted portion of the digital elevation map data are visible.

20. The passive ATR method of claim 19, wherein the generating range-to-pixel map data comprises:
interpolating the sparse range map data to approximate a range to the extracted portion of the digital elevation map data for angles from the passive image sensor for which pixels in the extracted portion of the digital elevation map data are not visible.

* * * * *